Dec. 12, 1967   A. C. PETERSON   3,357,656
TURBINE PROPULSION AND DRIVE FOR AIRCRAFT ROTOR MEANS
Filed July 6, 1965   3 Sheets-Sheet 1

INVENTOR.
ADOLPHE C. PETERSON

Dec. 12, 1967   A. C. PETERSON   3,357,656
TURBINE PROPULSION AND DRIVE FOR AIRCRAFT ROTOR MEANS
Filed July 6, 1965   3 Sheets-Sheet 3
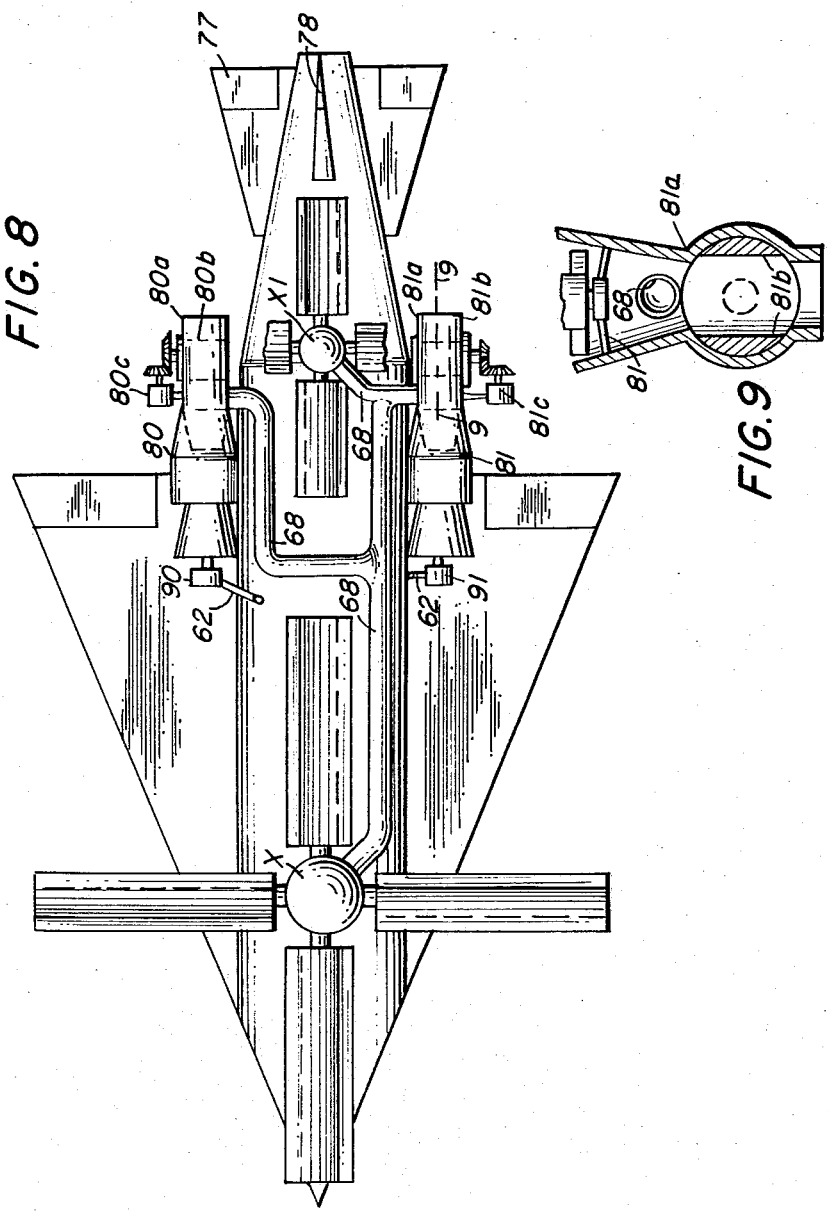
INVENTOR.
ADOLPHE C. PETERSON United States Patent Office 3,357,656
Patented Dec. 12, 1967

3,357,656
TURBINE PROPULSION AND DRIVE FOR
AIRCRAFT ROTOR MEANS
Adolphe C. Peterson, 4623 Bruce Ave. S.,
Minneapolis, Minn. 55424
Substituted for abandoned application Ser. No. 203,403,
June 18, 1962. This application July 6, 1965, Ser. No.
474,203
17 Claims. (Cl. 244—17.23)

ABSTRACT OF THE DISCLOSURE

This aircraft system involves aircraft propulsion and also sustentation by a supplemental rotor driving turbine rotor and involves also a main propulsion turbine unit for propulsion of the aircraft in normal translational flight, this main propulsion turbine unit providing gaseous fluid under pressure for driving the supplemental rotor driving turbine rotor by connective conduit means between the main turbine unit and the supplemental turbine rotor. The aircraft has fixed wing means for normal sustentation in flight and supplemental sustentation is provided by the sustentation rotor as driven by the supplemental rotor driving turbine rotor, for landing and take-off operation.

My invention relates to turbine propelled rotor sustentation and propulsion means and especially to an improved form of drive for such means, wherefore it is called "Turbine Propulsion and Drive for Aircraft Rotor Means."

The principal objects of my invention are to provide a form of rotor sustentation means for aircraft, which means shall be simple in construction, somewhat lower in first cost of construction, somewhat lower in cost of operation and maintenance, and which especially shall have certain other advantages hereinafter stated. A chief object in this invention is the provision of a form of rotor means for propulsion, which means, because of its special and novel form of construction and utilization of fuel for the propulsion of the rotor means, results in improved efficiency in the use of fuel and therefore also for the propulsion of the aircraft on which it is used. Efficiency in use of fuel results in part from the more direct application of the power effect of combustion upon the rotor means, and in part from a primary fuel use and a secondary fuel use of fuel with the air which is provided for combustion. Some improved efficiency results from the fact that rotor propulsion effect is at all times similar in direction to jet effect of the rotor propulsion drive means.

Another important advantage provided by this invention is the fact that this system provides inherently a method of control of the direction of propulsion of an aircraft, which is effective in use of the aircraft, either in single units of the device or a multiple number of such units, this directional control of the units being especially effective for control to enable hovering of the aircraft or slow descent or landing and take-off of the aircraft.

An especial objective is the provision of a form of turbine drive means and its application to a dual rotor means, which results in an efficient drive between the turbine and a pair of airfoil rotors, and which also is of such form that the cost of application of the drive is less than is customary with such aircraft of such large power and equivalent power. Application of power drive to aircraft of the helicopter type is usually accomplished only with considerable complication in a drive train, and such gear drive means is usually very costly in construction.

All of the advantages enumerated will appear in the description of the device, and in general it may be stated, that the objective is the provision of better, cheaper and more easily controlled aircraft. My device is applicable to such aircraft as are entirely rotor sustained, or such as are partly rotor sustained and partly fixed wing sustained, or such as are in operation, convertible from one to the other form of operation, that is as fixed wing or as propelled rotor sustained means.

In the accompanying drawings which illustrate my invention like characters refer to like parts throughout the drawings, insofar as is practicable. The principal devices and combinations of devices are as hereinafter described and as defined in the claims.

Referring to the drawings:

FIGURE 1 is a view chiefly in vertical section on the line 1—1 of FIGURES 2 and 7, this section being on a plane, which in the travel propulsion of the aircraft, is a vertical plane which lies vertically in the direction of translational travel of the aircraft on which the unit is placed, some parts being in full side elevation, some parts being broken away, this being chiefly the part of the structural frame of the aircraft.

FIGURE 2 is a view chiefly in horizontal section on the line 2—2 of FIGURE 1, some parts being in full plan view, parts below the plane of the section being not shown.

FIGURES 3 and 4 are detail figures, FIGURE 3 being in section partly on the line 3—3 of FIGURE 1, FIGURE 4 being in section partly on the line 4—4 of FIGURE 1, some parts of each figure being in side elevation.

FIGURES 8 and 9 show a modified form, FIGURE 9 being a section on line 9—9 of FIGURE 8.

Referring first to FIGURES 1, 2, 3, 4, which show one unit which is my invention, in general, this unit comprises one airfoil rotor A and another airfoil rotor B and these airfoil rotors are mounted on a mounting pylon which is generally designated as C, and the unit containing the rotors and a turbine means D is mounted on a fuselage structural frame which is depicted by a segment of such frame which is designated as E.

Figure 1:
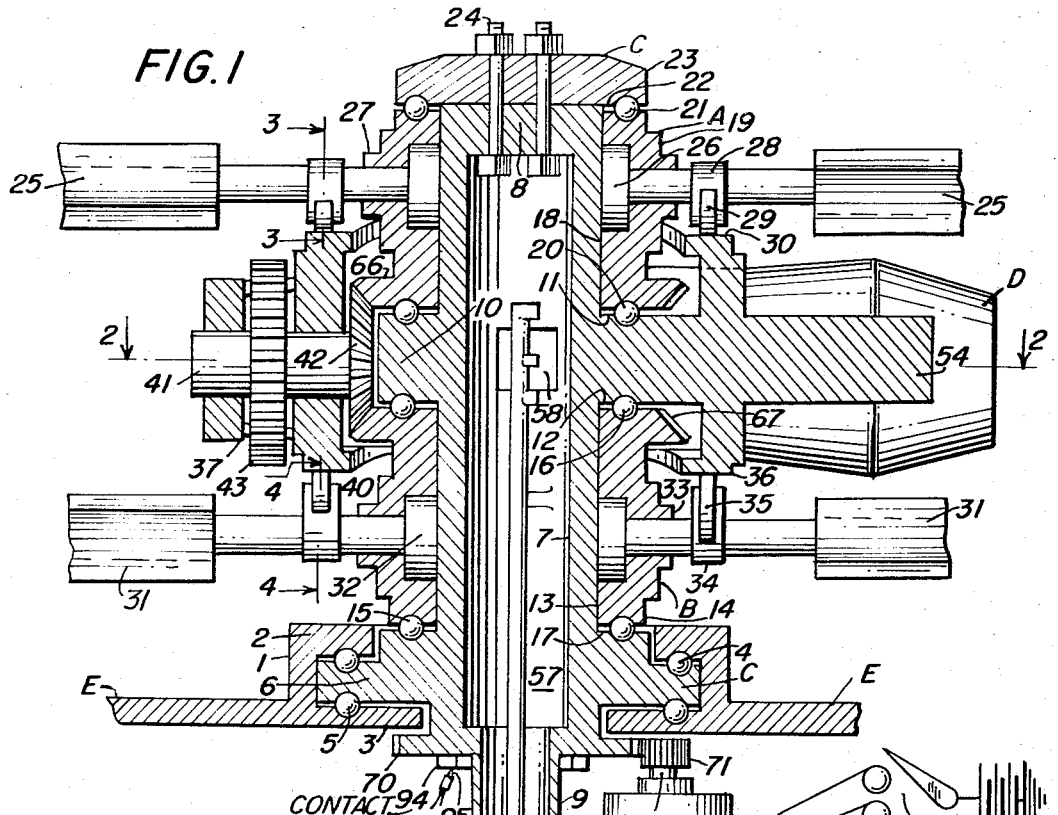
Figure 3:
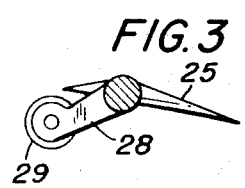
Figure 4:
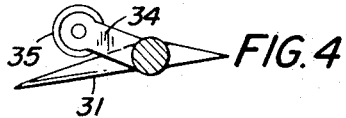
Figure 2:
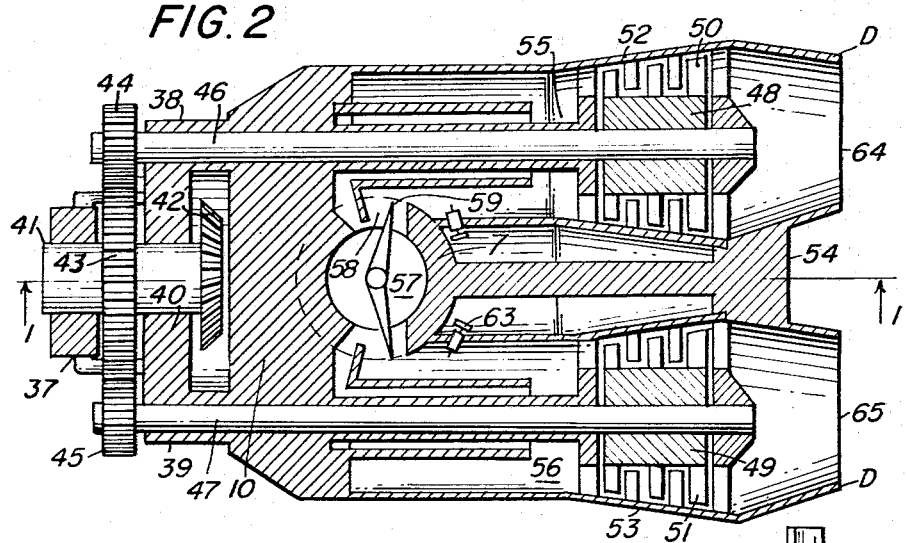

The fuselage E has formed or firmly attached to its structural frame F a mounting bearing 1 which has an upper annular bearing part 2 and a lower annular bearing part 3. Between the bearing parts 2 and 3 there is mounted by ball bearing means 4 and 5 a bearing disk 6 which is horizontally placed when in a normal position for flight of the aircraft and is formed with or very firmly attached with, by any means, the vertical section 7, this having generally the form of a rather large diameter tube which is closed at its upper end by the member 8 and at its lower end has extending downwardly from it and axially coincidental with it the so-called bearing tube or conduit 9, this being rotatable with the pylon 7 when the latter is rotated. The pylon 7 has formed with it or firmly attached with it substantially intermediately of its vertical length a fixture 10 which is disposed horizontally and has formed at the location about pylon 7 an upper bearing surface 11 and a lower bearing surface 12 and which fixture 10, extended horizontally as shown in FIGURES 1 and 2, forms a support for the turbine means which is hereinafter described.

Below the fixture 10 there is formed on the exterior annular face of the pylon 7 a bearing surface 13 about which is placed so as to be rotatable thereabout the rotor 14 of the airfoil rotor B and that rotor hub 14 is supported rotatably in its vertical position (axially) by ball bearing means 15 and 16, the former between the rotor hub and the upper bearing surface 17 formed on the upper face of bearing disk 6 and the latter formed between the rotor hub 14 and the lower bearing surface 12 of fixture 10.

Above the fixture 10 there is formed on the exterior annular face of the pylon 7 a bearing surface 18 about which is placed so as to be rotatable thereabout the rotor hub 19 of the airfoil rotor A and that rotor hub 19 is supported rotatably in its vertical position by ball bearing means 20 and 21, the former between the rotor hub 19 and the upper bearing surface 11 of fixture 10 and the latter formed between the rotor hub 19 and the lower bearing surface 22, which is formed on the lower side of the bearing cap 23, the latter being attached firmly by bolts 24 to the member 8 of pylon 7 so that it can support the weight to be carried by the airfoil rotor A. The airfoil rotors A and B by the bearing means described in relation to the rotor hubs will each be rotatable in coincidental vertical axes which axes are also coincidental with the vertical axis of the pylon 7.

The rotor hub 19 carries with it in a substantially horizontal plane the airfoil blades 25 of which there is contemplated to be four only two however being shown in FIGURE 1, and each of these airfoil blades 25 is oscillatively mounted by a bearing flange 26 in a blade bearing 27 formed in or attached to rotor hub 19, so that the airfoil blade may have oscillation as hereinafter described. Each airfoil blade 25 carries also fixed with it a cam lever 28 which has trunnioned therein a roller 29 the latter being adapted to travel upon the upper surface of the annular cam 30 which is fixed on the fixture 10 in such manner that travel of the cam lever and its roller will not be interfered with as rotor hub 19 is rotated on the pylon.

The rotor hub 14 carries with it in a substantially horizontal plane the airfoil blades 31 of which there is contemplated to be four only two however being shown in FIGURE 1, and each of these airfoil blades 31 is oscillatively mounted by a bearing flange 32 in a blade bearing 33 formed in or attached to rotor hub 14, so that the airfoil blades may have oscillation as hereinafter described. Each airfoil blade 31 carries also fixed with it a cam lever 34 which has trunnioned therein a roller 35 the latter being adapted to travel upon the lower surface of the annular cam 36 which is fixed on the fixture 10 on its lower side, opposite to that of the other cam surface, in such manner that travel of the cam lever and its roller will not be interfered with as rotor hub 14 rotates on the pylon. It will be noted that the cam levers and their rollers of rotor hubs 19 and 14, respectively, travel in opposite directions rotatably about the pylon, and that the cam levers of the upper rotor 19 extend forwardly of the axis of oscillation whereas the cam levers and their rollers of the rotor hub 14 extend rearwardly of the axis of oscillation, so that in each case the trailing edge of the attached airfoil blade is depressed according to the formation of the cam surface and thereby to procure the deepened pitch angle of the respective airfoil blade. The formation of the cam surfaces is such that the deepened pitch angle of airfoil blades of rotor A is in a phase, as to each airfoil blade, which is, a diametrically opposite phase compared to the deepened pitch phases of blades of the other rotor B. Thereby as the rotor hubs rotate, in their opposite directions, one rotor hub has deepened pitch angle of each airfoil blade on one side of the axis of the pylon 7 while the other rotor hub has deepened pitch angle of each airfoil blade on the opposite side of the axis of the pylon, and that as to all airfoil blades of both rotors A and B, the result is travel propulsion in the same direction as to the plane of rotation of the rotors, that is in the same direction as one radius extending from the axis of pylon 7 in the horizontal plane of rotation.

The fixture 10 has formed therewith forward of the axis of pylon 7 a horizontally and laterally extended bearing fixture 37 in which are formed turbine shaft bearings 38 and 39, respectively, on opposite sides of the axis of the pylon 7, and in which there is also formed the intermediate gear shaft bearing 40 in which there is mounted to rotate on a horizontal axis which is perpendicular to the vertical axis of pylon 7 and extended rearwardly from the pylon 7 in the vertical plane of the axis of pylon 7. In gear shaft bearing 40 there is rotatable the intermediate gear shaft 41 which has fixed thereon at its rearward end the bevel gear 42 and which has fixed thereon forwardly of gear 42 the large spur gear 43. The large spur gear 43 is in mesh with one side of the axis, horizontally, the spur gear 44 and on the other side, horizontally, the spur gear 45, the former spur gear being fixed on a turbine shaft 46 and the latter spur gear being fixed on the turbine shaft 47. The turbine shafts are in one horizontal plane perpendicular to the axis of pylon 7, one being laterally of the pylon 7 on one side and the other laterally of pylon 6 on the opposite side. The turbine shafts 46 and 47 are respectively fixed with their associated turbine rotors 48 and 49, which carry turbine blades 50 and 51, respectively.

The turbine rotors 46 and 47 with their turbine blades rotate in turbine casings 52 and 53, respectively, and the turbine casings are fixed on opposite lateral sides of the axis of pylon 7 by the fixture 10 by the latter's rearwardly extended arm 54. Each of the turbine casings receives combustion gases (or just air or exhaust gases according to the construction) from the combustion chambers 55 and 56, respectively, and such combustion chambers each receive gaseous fluid from the internal conduit 57 in the pylon 7 by way of the passages 58, and each chamber 55 and 56 may or may not (according to the construction) receive fuel by fuel nozzles 59 from the vertical fuel conduit 60 which is vertically axially of pylon 7 and at its lower end has rotation or oscillation in a conduit bearing 61 whereby fuel may be received from fuel conduit 62. While such fuel conduit means is shown, this is not essential in any particular construction, as fuel supply may be omitted and not combusted in the combustion chambers 55, 56.

The combustion chambers 55, 56 may each have spark plugs 63 although such means may also be dispensed with according to the construction. The combustion chambers 55, 56 may otherwise be designated as gaseous fluid chambers, and each has discharge to atmosphere after the gaseous fluid has passed through the turbine casings wherein the turbine rotors rotate, such discharge being by the discharge jets 64, 65, respectively, and such discharges are each in the direction parallel to each other and perpendicular to the axis of pylon 7 and in the same direction and that direction is the same as the propulsion force exerted by the pair of rotors A and B, so that such remaining propulsion force as there may be in the gaseous fluid is in addition to that produced by the rotors A and B.

The bevel gear 42 is on one side of the axis in engagement with the bevel gear 66 which is fixed on the lower end of the rotor hub 19 and on the other side is in engagement with the bevel gear 67 which is fixed on the upper end of the rotor hub 14, each of such bevel gears 66, 67, being rotatable on a vertical axis which is coincidental with the axis of pylon 7. Since such bevel gears are on diametrically opposite sides of the bevel gear 42, the rotation of the rotor hubs 14 and 19, in opposite directions is procured, and the gear ratios are such that there is considerable rotation reduction as between bevel gear 42 and the bevel gears 66, 67. There is also rotation reduction as between the turbine shafts and the gear shaft so that the total reduction is thus considerable and adequate.

The bearing conduit 9, which has delivery to the internal conduit in pylon 7, receives gaseous fluid, either air under presure or gaseous exhaust products, according to the construction, from a gaseous fluid conduit 68, related to the rotor unit described, and the bearing conduit 9 may rotate or oscillate in the bearing conduit 69 fixed with conduit 68. The pylon 7 at its lower end below the fuselage bearing fixture (for the pylon) has fixed thereon a large spur gear 70 which is in gear with small gear 71, the latter being rotatable by electric motor shaft 72 of the electric motor 73 this being subject to driving by any source of electric energy and as controlled by any control means, such as a switch means 74 for driving in either direction, and for either oscillation of the pylon 7 or rotation thereof as may be found desirable in any construction.

Figure 7:
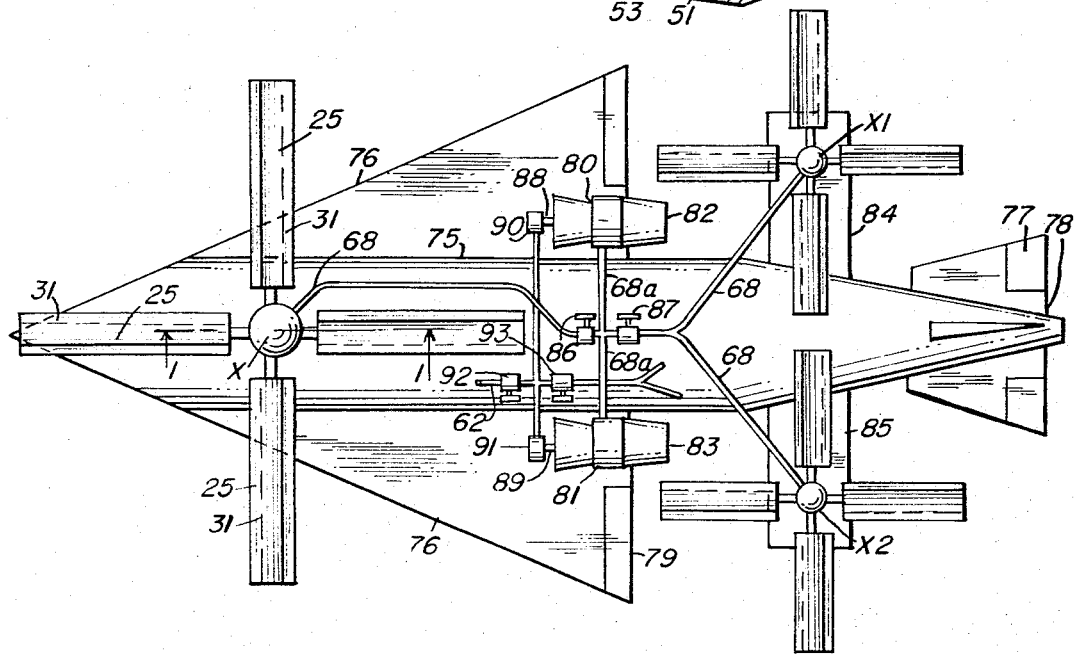
FIGURE 7 is a much reduced scale figure of an aircraft having the units.

Referring now to FIGURE 7, this figure shows in diagrammatic plan view an aircraft fuselage 75 having relatively small fixed wings 76 (one on each lateral side), having rudders 77 and 78 (for vertical and horizontal direction), ailerons 79, a pair of propulsion turbines 80, 81, having jet discharges 82, 83, and having fixed on the upper side of the fuselage a main rotor unit X, such as has been described, and having fixed on the fuselage by lateral auxiliary wings or spars 84, 85, small rotor units X1, X2, each of which is similar to unit X and as has been described in connection with FIGURES 1 to 4, such units X1, X2, being however each of approximately one-half the propulsion power of that of the rotor unit X.

The propulsion turbines 80, 81, each may deliver compressed air, at pressures ranging from say fifty to 100 pounds per square inch to conduits 68a, and thereby to gaseous fluid conduit 68, there being one of the latter to each unit X, X1, X2, and there being manually or otherwise controlled valves 86, 87, interposed. Each propulsion turbine 80 or 81 by its turbine shaft 88, or 89, drives a fuel pump 90 or 91, which pump is in addition to that usually driven in connection with propulsion turbines (not shown), that is which are used to supply combustion fuel for the propulsion turbines, and fuel from such pumps 90, 91, as controlled by any fuel valve means or control means 92, 93, may be delivered to the combustion chambers or gaseous fluid chambers of the rotors A and B, of each unit (if so contemplated by the construction). The spark plugs 63 may be served with electric current for ignition by contact ring 94 and brush 95 and such interconnecting electric conducting means and supply means as is needed therefor.

Having described in detail the construction, the operation and functioning in general is now described in the following. In operation for a take-off of the aircraft, the propulsion turbines 80, 81 are first placed in operation by the controls usually provided for such turbines and fuel is by the usual means in such turbines delivered to the combustion chambers of such turbines 80, 81, so that their operation ensues with, as is customary in such turbines, induction of atmospheric air, combustion of fuel with at least a part of such air which is then under compression, passage of air and combustion gases through the turbines to atmosphere. In operation the turbines 80, 81, produce a surplus of compressed air and the pilot may then open the manual valves 86, 87, whereupon air under pressure will flow to the conduits and thereby to the internal conduits of each rotor unit X, X1, X2, and the pilot may then permit fuel flow by valves or control means 92, 93, whereupon fuel under pressure will flow to the combustion chambers or as otherwise designated, the gaseous fluid chambers, of the rotor units, and such flows of fuel and air will be combusted in the rotor units, the spark plugs supplying the ignition, and products of combustion will flow through the turbine casings of the rotor units resulting in driving of the turbine rotors of rotor units and transmission of driving power to the bevel gear 42 and thereby to the large bevel gears 66, 67, so that the rotors A and B of each rotor unit are driven in opposite directions. By control of the flow of air under pressure and the flow of fuel to the combustion chambers of the rotor units, the pilot is enabled to increase or diminish the power output of the turbines of the rotor units, and when he desires he may then increase the power output so that the rotor units will in the aggregate exert enough lifting power to cause take-off of the aircraft.

Figure 5:
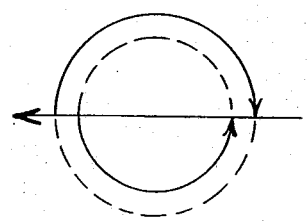
FIGURES 5 and 6 are diagrammatic figures.

In such operation of the rotor units each rotor unit will exert driving power for translational propulsion of the aircraft and for sustenation and the pair of rotors of each rotor unit will exert propulsion thrust in the same direction, forwardly of the aircraft, and this results from the fact that each rotor A and B, on each side of its axis, has deepened pitch angle, and from the fact that such deepened pitch angle of one rotor is on one side and that of the other on the other side, and from the fact, that the rotors of the unit rotate in opposite directions. In FIGURE 5 the solid arrows represent the phase of the rotors (one arrow as to one and the other arrow as to the other) when there is deepened pitch angle, each such arrow designating a semi-circle of deepened pitch angle. In FIGURE 5 the diametrical arrow represents the direction of the resulting propulsion which is horizontally exerted.

Figure 6:
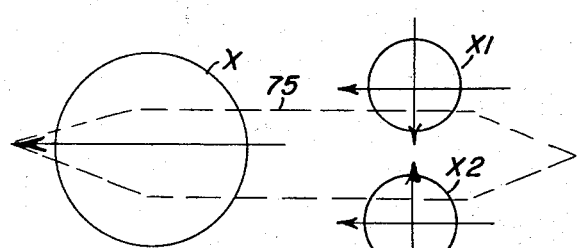

It is assumed that in travel forwardly, when raised from the landing field or other carrier medium, the rotor units, as shown in FIGURE 7 will all exert travel propulsion in the same direction, forwardly of the aircraft. When the pilot desires to hover in the air over any land site, he may then condition the rotor units for such hovering by using the control switch means of either the rotor unit X or, alternatively of the two units X1, X2, that is means 74, to cause rotation of the selected rotor unit means to a position such that the propulsion is transversely of its, or their axes, in the opposite direction to that or the rotor unit means which is not so controlled as to change its direction of propulsion. In making such change of direction, the pilot may cause the two rear units X1, X2, to be so changed and he may cause the pylon means 7 of such two units to turn in opposite directions so that, as shown in FIGURE 6, propulsion exertion of the two will be opposite, and thereby, in such changing control, the aircraft will not be moved laterally from its prevailing direction of travel. In making such change of propulsion, the turbine casings with their turbine shafts will move about the axis of the pylon in the horizontal plane and the cams of each rotor unit, or the rotor units, will also similarly move with the pylon 7 in its rotation of its axis, so that when the rotor unit (or units) are so changed, for opposite directional propulsion, the deepened pitch angle thrust as well as the thrust of exhaust discharge from the units will be in the same horizontal direction, so that all propulsion effect of a rotor unit is thus similar, as to translational propulsion.

It will be noted that all change of propulsional direction by a single rotor unit is effected by the turning of the pylon 7, with its associated cams, turbines and transmission gear and jet discharges, and that such turning is by the turning of the large spur gear 70 and its attached bearing disk 6 and the nylon 7, so that the entire rotor unit is thus affected in its relation to the fuselage structure of the fuselage of the aircraft. I have not shown any means for change of the relative pitch angle of airfoil blades as may be used for change of the lifting effect, as such means is commonly known and may be applied as is customary. It is contemplated however that the pilot may change the lifting effect by change of the power output so as to effect increased speed of the rotors of the rotor units, and it is contemplated that the rotors should be designed to secure the proper proportion of sustenation or lifting effect, as well as the proper proportion of translational propulsion effect. But it is contemplated also that the pilot may utilize the effect of the ailerons, as shown in FIGURE 7 to assist in change of the elevation at which the aircraft travels and also that the pilot may use the rudders for vertical as well as horizontal directional control in all movement of the aircraft, while having available to him also the directional change means as provided by the control of the rotor units, as above described.

Referring now to FIGURE 8 which shows a modified form of gaseous fluid use in the rotor unit and aircraft which is shown in FIGURES 1 to 7, this view is a plan view of an aircraft incorporating in it rotor units as in FIGURE 7 and incorporating in it also propulsion turbines as in FIGURE 7. In this form (FIGURE 8) there is however a difference in the association of the rotor units with the propulsion turbines and a difference accordingly also in the use of the gaseous fluid in the rotor unit turbines. In FIGURE 8 there are shown only two rotor units X and X1 and each of these are similar or may be similar to such units as are shown in FIGURE 7. The rotor unit X1, which is at the rear end of the fuselage structure, may be smaller than that designated X at the forward end. The propulsion turbines 80, 81 in this case are connected with the rotor units X, X1, by the conduits 68, but the connection is not as in FIGURE 7 with the compressor of the turbines for delivery of compressed atmospheric air, but the connection is with the exhaust of the propulsion turbines 80, 81 so that exhaust gases which contain in part combustion gases and chiefly air, say in the ratio of four-fifths or three-fourths air to one-fifth or one-fourth combustion gases, are delivered through the conduits 68 to the internal conduits of the rotor pylons and thereby to the gaseous fluid chambers of the rotor turbines. The propulsion turbines 80, 81, in this case have formed in their jet discharge tubes 80a, 81a, a valve means 80b, 81b, and this valve means as in each jet discharge tube may permit exhaust direct to atmosphere as is customary in propulsion turbines, or in the alternative the valves 80b, 81b, may each or either of them be turned to prevent flow of the exhaust gases from the turbine direct to atmosphere for jet propulsion of the aircraft and thus to force the flow of all the exhaust gases through the conduits 68 to the rotor units X, X1, whereupon the turbines of the rotor units will receive all the exhaust gases from the propulsion turbines 80, 81, and that flow of exhaust gases may be used with the combustion of additional fuel or such exhaust gases may pass through the rotor unit turbines for use to drive them without the combustion of additional fuel with the uncombusted air of the turbine exhausts. Fuel may be supplied by means as in the FIGURE 7 but may or may not be used for the additional propulsion or work energy. The valves 80b, 81b, may be turned to provide direct jet discharge when sufficient elevation of the aircraft has been attained whereupon the aircraft will travel at high speed with the principal sustentation provided by the fixed wing airfoil surfaces, some being supplied by the rotor units. The valves 80b, 81b, may be turned to prevent such direct jet discharge and thereupon the exhaust gases will flow entirely to the rotor unit turbines and fuel may be provided for supplemental combustion in the rotor unit turbines by manual or other control of the fuel valves so that then there is large energy output by the rotor unit turbines and the rotors of the rotor units are driven at high speeds to provide the sustenation required for hovering flight, or landing or take-off performance. The valves 80b, 81b, are turned by any means diagrammatically illustrated and designated 80c, 81c, respectively, such means of automatic or manual type are well known and are not therefore particularly shown. Valves such as 86, 87 may be provided in FIG. 8.

Each rotor unit is shown as having two turbines but there may be only one turbine in each rotor unit, such turbine having transmission gearing as may be necessary to accomplish the same fuction, as is shown in the figures and described. The blades of rotor A are so actuated for deep pitch by the cam 30, and the blades of rotor B are so actuated by the cam 36 for deep pitch, that blades of rotor A are moved for deep pitch on one side diametrically of the axis of pylon 7, and the blades of rotor B are moved for deep pitch on the other (diametrically opposite) side of the axis of pylon 7. Each blade in deep pitch phase creates a vertical sustenation thrust and also a component horizontal thrust which is exerted in direction perpendicularly to the vertical axis of pylon 7. The horizontal thrust of rotors A and B results in travel translational thrust in one direction perpendicular to the axis of pylon 7 and this propulsion direction does not change with respect to pylon 7 whatever is the rotational position of pylon 7 with respect to the aircraft fuselage 75. Accordingly when pylon 7 is by its controls rotated on its axis, the propulsive thrust direction will also change in the plane transversely of the pylon 7. The vertical sustentation thrust of the particular rotor unit will continue to be of the same force in any rotation position of pylon 7 in the fuselage structure.

In order to complete the conditioning of the rotor units to accomplishing hovering result, the pilot by the means 74 (or any type of control for motors 73) continues the rotative movement of pylon 7 of units X1 and X2 so that each pylon 7 (with its associated elements) is moved through a full 180 degrees of rotation (from normal travel position) and the units X1 and X2 will each exert propulsive thrust perpendicularly to the axis of pylon 7, which thrust is diametrically opposite in direction, horizontally, to the horizontal propulsive direction of the unit X. The result is then, that thrust of units X1 and X2 horizontally neutralizes or nearly neutralizes (according to design) the propulsive thrust horizontally of unit X. Substantially a similar result is effected if the pylon 7 of unit X is rotated 180 degrees, units X1 and X2 being held without rotation of their pylons 7.

The fixture 10 is in part a part of the pylon structure 7, being firmly constructed therewith, in such manner that it is rotatable with the pylon 7 when that is rotated by the control means provided. The internal conduit 57 passes through the pylon structure at the location of fixture 10 and that fixture extends outwardly of and around conduit 57 and is extended diametrically outwardly of the pylon 7 so that it forms a ring-like form which by part 37 forms and supports bearings 38, 39, 40, also ring-like cams 30, 36, and it also has formed on it bearing faces 11 and 12, and extended arm 54.

The turbines 80, 81, are, each of them, combustion gas turbines which provide reaction propulsion by gas expulsion rearwardly of the aircraft and each is of the well known or any construction, such as is commonly used and has air induction and compression, fuel supply, combustion chamber means and turbine rotor means driving its compressor means. The change of lifting effect in the airfoil rotors as described is effected by change of the power output of the turbines 80, 81, and also of the rotor driving turbines 48, 49, driving rotor units X, X1, X2, so that speed of the airfoil rotors may be increased sufficiently to provide lifting thrust sufficient to provide climbing progress, and this may be assisted by the ailerons 79. Helicopters as commonly now known and used, have means to increase or diminish pitch angle of blades and such means may if found desirable be incorporated in the construction in any manner, being however not essential in the device as illustrated and described. Referring to use of the word "fixture," this word refers to a construction of the pylon structure at the level designated which includes several parts or elements (otherwise also designated), it being noted that the fixture being part of the pylon structure and the driving turbines fixed by the parts 10, 54 and 6, in control movements, rotate or turn as an integral unit and the cam faces 30 and 36 are also part of that integral construction and movement, rotationally of the axis of pylon 7, so that rotation control of the pylon structure 7 produces change of propulsive direction of thrust by the rotors A and B of the unit and also by the jet discharge from the turbines driving the rotors A and B.

The term gaseous fluid as used in the specification and in the appended claims is contemplated to include a fluid which may be substantially entirely atmospheric air or may be combustion products and air or combustion products chiefly. While I have shown and described particular devices and combinations of devices in the above presentation of my invention, it is contemplated and intended that other detailed devices and combinations of devices may be used in the realization of my invention without departing from the spirit and contemplation of the invention.

What I claim is:

1. In a rotor means for aircraft: a pylon structure mounted on an aircraft fuselage and formed to have a rotor bearing and to have adjacent a side thereof a turbine mounting and a turbine casing affixed integrally therewith; an airfoil rotor rotatably mounted by said rotor bearing on said pylon structure; a turbine rotor means rotatably mounted in the turbine casing and having turbine blade means rotating in the turbine casing and having transmission speed reduction means transmitting to the airfoil rotor; a primary combustion turbine mounted on the aircraft fuselage and having a discharge for gaseous fluid through conduit means in said pylon structure and to said first named turbine casing to drive the turbine rotor means; the mounting of said pylon structure on said aircraft fuselage including a bearing means between said pylon structure and said aircraft fuselage whereby said pylon structure is rotatable on its axis in said last named bearing means.

2. In a rotor means for aircraft: a pylon structure mounted on an aircraft fuselage and formed to have a rotor bearing and to have adjacent a side thereof a turbine mounting and a turbine casing affixed integrally therewith; an airfoil rotor rotatably mounted by said rotor bearing on said pylon structure; a turbine rotor means rotatably mounted in the turbine casing and having turbine blade means rotating in the turbine casing and having transmission speed reduction means transmitting to the airfoil rotor; a primary combustion turbine mounted on the aircraft fuselage and having a discharge for gaseous fluid through conduit means to said first named turbine casing to drive the turbine rotor means; the airfoil blades of said airfoil rotor having oscillative mounting in the rotor hub of said airfoil rotor and pitch change lever means on each said airfoil blade; the pylon structure having integrated means to induce pitch change action by said pitch change lever means; the mounting of said pylon structure on said aircraft fuselage including a bearing means between said pylon structure and said aircraft fuselage whereby said pylon structure is rotatable on its axis in said last named bearing means.

3. In a rotor means for aircraft: a pylon structure mounted on an aircraft fuselage structure and formed to have a first rotor bearing and a second rotor bearing, the bearings being spaced apart axially thereof, and to have between said rotor bearings an affixed integral mounting adjacent a side of the axis of the pylon structure and a turbine casing mounted thereby and affixed thereto; a secondary turbine rotor means rotatably mounted in the turbine casing; a fluid chamber means formed in said pylon structure and turbine casing and therebetween and forming passage for gaseous fluid into and through the turbine casing; a first rotor hub rotatably mounted on said first rotor bearing and having airfoil blades mounted therewith to be carried therewith in rotation; a second rotor hub rotatably mounted on said second rotor bearing and having airfoil blades mounted therewith and to be carried to rotate in a plane substantially parallel to the plane of rotation of the first rotor hub and its attached rotor blades; a gear affixed on said first rotor hub and a gear affixed on said second rotor hub, the said gears being respectively coaxial with said first and second rotor bearings; a transmission reduction means between the said gears and said turbine rotor means, said transmission reduction means being mounted for rotation in said pylon structure; a propulsion turbine unit having a gaseous fluid course comprised of air inlet, compressing course with compressor rotor therein, a combusion chamber means, a propulsion rotor course with propulsion turbine rotor therein, a gas jet discharge; means for fuel supply to the combustion chamber means; connective conduit means between said gaseous fluid course and said gaseous fluid chamber means and providing passage for gaseous fluid under pressure from said gaseous fluid course and to said gaseous fluid chamber means.

4. The device as defined in claim 3 and: fuel pump means operated by said propulsion turbine unit and connecting conduit means through said pylon structure to deliver fuel to said gaseous fluid chamber means for combustion therein.

5. The means as defined in claim 3 and: a valve means in said gas jet discharge and subject to a control means to under one condition permit gaseous fluid flow from said gaseous fluid course through said gas discharge to atmosphere for travel propulsion of said aircraft in normal flight travel direction, and to under another condition of control restrict flow of gaseous fluid from said gas jet discharge to atmosphere, flow under either condition of control from said gaseous fluid course to said gaseous fluid chamber means through said pylon structure being enabled.

6. In a rotor means for aircraft: a plyon structure mounted on an aircraft fuselage structure formed to have a first rotor bearing and a second rotor bearing, the bearings being spaced apart axially thereof and to have between said rotor bearings an affixed mounting adjacent a side of the axis of the pylon structure and a turbine casing mounted thereby and affixed with the pylon structure; a turbine rotor means rotatably mounted in the turbine casing; a gaseous fluid chamber means formed in said plyon structure and turbine casing and therebetween and forming passage for gaseous fluid to the turbine casing; a first rotor hub rotatably mounted on said first rotor bearing and having rotor airfoil blades mounted therewith to be carried therewith in rotation; a second rotor hub rotatably mounted on said second rotor bearing to rotate in a plane substantially parallel to the plane of rotation of the first rotor hub and having attached airfoil blades; a gear affixed on said first rotor hub and a gear affixed on said second rotor hub, the said gears being respectively co-axial with said first and second rotor bearings; a transmission reduction means between said gears and said turbine rotor means, said transmission reduction means being mounted in said pylon structure and turbine casing; a primary engine and compression unit on said fuselage structure and having air and fuel supplies thereto and having conduit means to deliver gaseous fluid under pressure to a conduit means formed in said pylon structure and delivering to said gaseous fluid chamber means and a discharge from said turbine casing; air foil blades of said first rotor hub and said second rotor hub having each oscillative mounting in its associated rotor hub and each airfoil blade having pitch change lever means; the pylon structure having integrated means to induce pitch change by said pitch change lever means; the mounting of said pylon structure in said aircraft fuselage including a bearing means between said pylon structure and said aircraft fuselage whereby said pylon structure and its integrated means is rotatable on its axis in said last named bearing means; the induced pitch change actuation producing in the blades of said first rotor hub and said second rotor hub, respectively, deepened pitch phases in sections of the rotation cycle diametrically oppositely of the axis of rotation.

7. The device as defined in claim 6 and: a valve means intermediately of the conduit means and arranged therewith and with the discharge from said primary engine and compression unit and subject to a control means to under one condition direct gaseous fluid from said primary engine through said conduit means to said turbine casing to drive said turbine rotor means and to under another condition direct gaseous fluid from said primary engine through said discharge to provide propulsion thrust upon said aircraft.

8. In rotor means for aircraft: a fuselage structure, a plural number of pylon structures each mounted on said fuselage structure to be carried therewith in travel, each pylon structure having rotatably mounted thereon a pair of airfoil rotors each having driving means in combination therewith to rotate the airfoil rotors, each airfoil rotor having blade pitch change means cyclically varying pitch of blades; a primary engine means and compression unit therewith; conduit means between said primary engine means and a conduit means in each pylon structure to convey gaseous fluid to secondary power production means formed on the pylon structure to drive the airfoil rotor means thereon; at least one of said pylon structures having bearing means between it and the fuselage structure whereby the pylon structure is rotatable relatively to the fuselage structure and control motor means for the rotation of the pylon structure; discharge means from the secondary power production means.

9. The device is defined in claim 8 and a jet discharge arranged to discharge gaseous fluid for travel propulsion of said aircraft in normal flight travel direction; a valve means intermediately of the jet discharge and said primary engine means and compression unit and arranged in connecting conduit means and subject to a control means to under one condition direct gaseous fluid from said primary engine and compression means to said jet discharge to atmosphere for propulsion thrust upon said aircraft, and to under another condition direct gaseous fluid from said primary engine and compression means through the conduit means in each pylon structure to associated secondary power production means to drive associated airfoil rotor means.

10. In rotor means for aircraft: a pylon structure mounted on an aircraft fuselage and formed to have two rotor bearings each having an axis coincidental with the pylon structure axis, such axis being perpendicular to the travel direction of the fuselage; the rotor bearings being spaced apart on said axis and each thereof having rotatable thereon a rotor hub, each thereof having airfoil blades carried thereon; a turbine mounting means affixed with the pylon structure intermediately of the rotor bearings and turbine casings affixed with said pylon structure in a plane perpendicular to said axis; turbine rotors one rotatable in each casing, means producing gaseous fluid flow through the casings to drive the turbine rotors and thereby to ambient air; an intermediate driving unit comprised of rotatably mounted means with an affixed driving bevel gear and an affixed spur gear and bearing means therefor intermediately of said rotor hubs in said pylon structure; a pair of bevel driven gears rotatably mounted to be on opposite sides of the driving bevel gear, one having driving connection with one rotor hub and the other having driving connection with the other rotor hub; the said spur gear having transmission reduction engagement between it and said turbine rotors.

11. In a rotor means for aircraft: a pylon structure mounted on an aircraft fuselage structure and formed to have a sustentation rotor bearing thereon and having a sustentation rotor rotatable thereon and to have mounted therewith a secondary turbine unit including a gaseous fluid chamber means, a turbine rotor course, a gas discharge; a sustentation rotor driving turbine rotor mounted for rotation in said secondary turbine unit and having connection by transmission reduction gear means with said sustentation rotor; a propulsion turbine unit having a gaseous fluid course comprised of, air inlet, compressing course with compressor rotor therein, a combustion chamber means, a propulsion rotor course with proplusion turbine rotor therein and driving said compressor rotor, a gas jet discharge; means for fuel supply to the combustion chamber means; connective conduit means between said gaseous fluid course and said gaseous fluid chamber means and providing passage for gaseous fluid under pressure from said gaseous fluid course and to said gaseous fluid chamber means and by said turbine rotor course and gas jet discharge and to atmosphere.

12. The means as defined in claim 11 and a valve means in said gas jet discharge and subject to a control means to under one condition permit gaseous fluid flow from said gaseous fluid course through said gas jet discharge to atmosphere for travel propulsion of said aircraft in normal flight travel direction, and to under another condition of control restrict flow of gaseous fluid from said gas jet discharge to atmosphere, flow under either condition of control from said gaseous fluid course to said gaseous fluid chamber means through said pylon structure being permitted.

13. In a rotor means for aircraft a pylon structure mounted on an aircraft fuselage structure and formed to have a first rotor bearing and a second rotor bearing, the bearings being spaced apart axially thereof, and to have between said rotor bearings an affixed integral mounting adjacent a side of the axis of the pylon structure and a turbine casing mounted thereby and affixed thereto; a turbine rotor means rotatably mounted in the turbine casing; a gaseous fluid chamber means formed in said pylon structure and turbine casing and therebetween and forming passage for gaseous fluid to the turbine casing; a first rotor hub rotatably mounted on said first rotor bearing and having airfoil blades mounted therewith to be carried therewith in rotation; a second rotor hub rotatably mounted on said second rotor bearing and having airfoil blades mounted therewith and to be carried to rotate in a plane substantially parallel to the plane of rotation of the first rotor hub and its attached rotor blades; a gear affixed on said first rotor hub and a gear affixed on said second rotor hub, the said gears being respectively coaxial with said first and second rotor bearings; a transmission reduction means between the said gears and said turbine rotor means said transmission reduction means being mounted in said pylon structure and turbine casing; a primary engine and compression unit on said fuselage structure and having air and fuel supplies thereto and having conduit means to deliver gaseous fluid under pressure to a conduit means formed in said pylon structure and delivering to said gaseous fluid chamber means and a discharge from said turbine casing; the mounting of said pylon structure on said aircraft fuselage including a bearing between said pylon structure and said aircraft fuselage whereby said pylon structure and the means carried therewith and affixed thereto is rotatable on its axis in said last named bearing means.

14. In a rotor means for aircraft; a pylon structure mounted on an aircraft fuselage structure and formed to have a first rotor bearing and a second rotor bearing, the bearing being spaced apart axially thereof, and to have between said rotor bearings an affixed integral mounting adjacent a side of the axis of the pylon structure and a turbine casing mounted thereby and affixed thereto; a turbine rotor means rotatably mounted in the turbine casing; a gaseous fluid chamber means formed in said pylon structure and turbine casing and therebetween and forming passage for gaseous fluid to the turbine casing; a first rotor hub rotatably mounted on said first rotor bearing and having airfoil blades mounted therewith to be carried therewith in rotation; a second rotor hub rotatably mounted on said second rotor bearing and having airfoil blades mounted therewith and to be carried to rotate in a plane substantially parallel to the plane of rotation of the first rotor hub and its attached rotor blades; a gear affixed on said first rotor hub and a gear affixed on said second rotor hub, the said gears being respectively coaxial with said first and second rotor bearings; a transmission reduction means between the said gears and said turbine rotor means said transmission reduction means being mounted in said pylon structure and turbine casing; a primary engine and compressing unit on said fuselage structure and having air and fuel supplies thereto and having conduit means to deliver gaseous fluid under pressure to a conduit means formed in said pylon structure and delivering to said gaseous fluid chamber means and a discharge from said turbine casing; airfoil blades of said first rotor hub and said second rotor hub having each oscillative mounting in its associated rotor hub and each airfoil blade having pitch change lever means; the pylon structure having integrated means to induce pitch change by said pitch change lever means; the mounting of said pylon structure on said aircraft fuselage including a bearing means between said pylon structure and said aircraft fuselage whereby said pylon structure and its integrated means is rotatable on its axis in said last named bearing means.

15. In a rotor means for aircraft: a pylon structure mounted on an aircraft fuselage structure and formed to have a first rotor bearing and a second rotor bearing, the bearings being spaced apart axially thereof, and to have between said rotor bearings an affixed integral mounting adjacent a side of the axis of the pylon structure and a turbine casing mounted thereby and affixed thereto; a turbine rotor means rotatably mounted in the turbine casing; a gaseous fluid chamber means formed in said pylon structure and turbine casing and therebetween and forming passage for gaseous fluid to the turbine casing; a first rotor hub rotatably mounted on said first rotor bearing and having airfoil blades mounted therewith to be carried therewith in rotation; a second rotor hub rotatably mounted on said second rotor bearing and having airfoil blades mounted therewith and to be carried to rotate in a plane substantially parallel to the plane of rotation of the first rotor hub and its attached rotor blades; a gear affixed on said first rotor hub and a gear affixed on said second rotor hub, the said gears being respectively coaxial with the first and second rotor bearings; a transmission reduction means between the said gears and said turbine rotor means said transmission reduction means being mounted in said pylon structure and turbine casing; a primary engine and compression unit on said fuselage structure and having air and fuel supplies thereto and having conduit means to deliver gaseous fluid under pressure to a conduit means formed in said pylon structure and delivering to said gaseous fluid chamber means and a discharge from said turbine casing; the mounting of said pylon structure on said aircraft fuselage including a bearing means between said pylon structure and said fuselage structure whereby said pylon structure is rotatable on its axis in said last named bearing means, and a control means supplying drive therefrom to said pylon structure to turn said pylon structure with its integrated means and affixed means on its axis in said last named bearing means.

16. In an aircraft: a fuselage structure, a pivot bearing fixed in the fuselage structure; a pylon rotatably mounted in the pivot bearing to be rotatable on a substantially normal vertical axis; an airfoil rotor having airfoil blades and a rotor hub by which it is rotatable on the pylon in a plane substantially perpendicular to the axis of the pylon each airfoil blade having mounting to be oscillative in the rotor hub on an axis extending outwardly substantially in the plane of rotation of the airfoil rotor; pitch angle change means actuable by pitch change actuating means mounted on the pylon and to be movable therewith in its rotation movement on its vertical axis; driving means operatively engaged with the rotor hub to rotate it; control actuation means for the pylon to turn the pylon in its pivot bearing; the said driving means engaged with the rotor hub including a turbine affixed to and carried on said pylon, transmission means carried on said pylon and engaging said turbine with said rotor hub; the said driving means engaged with the rotor hub including also gaseous fluid supply means carried by said fuselage structure and conduit means therefrom and through said pylon to said turbine to provide flow of gaseous fluid thereto.

17. In an aircraft: a fuselage structure, a pivot bearing fixed in the fuselage structure; a pylon rotatably mounted in the pivot bearing to be rotatable on a substantially normal vertical axis; an airfoil rotor having airfoil blades and a rotor hub by which it is rotatable on the pylon in a plane substantially perpendicular to the axis of the pylon; each airfoil blade having mounting to be oscillative in the rotor hub on an axis extending outwardly substantially in the plane of rotation of the airfoil rotor; pitch change means actuable by pitch change actuating means mounted on the pylon and to be movable therewith in its rotation movement on its vertical axis; driving means operatively engaged with the rotor hub to rotate it; control actuation means for the pylon to turn the pylon in its pivot bearing; the said driving means engaged with the rotor hub including a turbine carried on said pylon, transmission means carried on said pylon and engaging said turbine with said rotor hub; the said driving means engaged with the rotor hub including also gaseous fluid supply means carried by said fuselage structure, conduit means therefrom through said pylon to said turbine, and fluid discharge directed perpendicularly from said pylon axis.

References Cited
UNITED STATES PATENTS

| | | | |
|---|---|---|---|
| 2,143,024 | 1/1939 | Nemeth | 170—160.25 |
| 2,944,609 | 7/1960 | Sikorsky | 170—135.7 |
| 2,955,657 | 10/1960 | Peterson | 170—135.7 |
| 2,982,495 | 5/1961 | Griffith | 244—58 |
| 3,111,992 | 11/1963 | Peterson | 244—17.23 |

MILTON BUCHLER, *Primary Examiner.*

FERGUS S. MIDDLETON, *Examiner.*

A. E. CORRIGAN, P. E. SAUBERER,
*Assistant Examiners.*